United States Patent
Hullander

(10) Patent No.: US 11,403,476 B2
(45) Date of Patent: *Aug. 2, 2022

(54) SYSTEM AND METHOD FOR IDENTIFYING COMPUTING DEVICES IN A DATA CENTER

(71) Applicant: CORE SCIENTIFIC, INC., Bellevue, WA (US)

(72) Inventor: Eric Hullander, Edmonds, WA (US)

(73) Assignee: Core Scientific, Inc., Bellevue, WA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/992,093

(22) Filed: Aug. 12, 2020

(65) Prior Publication Data

US 2021/0240953 A1  Aug. 5, 2021

Related U.S. Application Data

(63) Continuation-in-part of application No. 16/779,563, filed on Jan. 31, 2020, now Pat. No. 10,783,410.

(51) Int. Cl.
*G06K 7/14*    (2006.01)
*G06K 7/10*    (2006.01)
*G06T 19/20*   (2011.01)

(52) U.S. Cl.
CPC ....... *G06K 7/1413* (2013.01); *G06K 7/10722* (2013.01); *G06K 7/10881* (2013.01); *G06T 19/20* (2013.01)

(58) Field of Classification Search
CPC .. G06K 9/6878; G06K 9/00711; G06K 9/629; G06F 21/34; G06T 17/05
See application file for complete search history.

(56) References Cited

U.S. PATENT DOCUMENTS

| | | |
|---|---|---|
| 8,818,768 B1 | 8/2014 | Fan et al. |
| 10,014,939 B2 | 7/2018 | Cha |
| 10,783,410 B1 * | 9/2020 | Hollander ............ G06K 9/6878 |
| 2014/0221984 A1 | 7/2014 | Calio et al. |
| 2016/0140868 A1 | 5/2016 | Lovett et al. |
| 2016/0171504 A1 | 6/2016 | Harriman |
| 2016/0364885 A1 | 12/2016 | Fathi et al. |

(Continued)

OTHER PUBLICATIONS

"Microprocessor-Controlled Visual Diagnostic And Status Indicator Employing a Finite-Length Repeating Binary Code Sequence", 1990, IBM Technical Disclosure Bulletin, vol. 32, issue 9A , (4 pages) (Year: 1990).*

(Continued)

*Primary Examiner* — David F Dunphy
(74) *Attorney, Agent, or Firm* — Fishman Stewart PLLC

(57) ABSTRACT

A system and method for managing large numbers of computing devices in a data center are disclosed. The computing devices are configured to flash their indicator lights in a pattern that encodes a device ID, and an image capture device such as a mobile phone or tablet captures the flashes in a series of images/video of the data center. The images/video are processed to create a three-dimensional (3D) model of the data center with computing device IDs positioned therein. The 3D model, including correctly positioned device ID indicators, can be rendered for the user of the mobile device to enable the user to more easily identify computing device locations.

17 Claims, 9 Drawing Sheets

(56) References Cited

U.S. PATENT DOCUMENTS

2017/0263016 A1    9/2017  Nodera

OTHER PUBLICATIONS

International Search Report and Written Opinion dated Jun. 4, 2021 related to corresponding International Patent Application PCT/US21/15799.
Rosebrock, Adrian, "Detecting Multiple Bright Spots In An Image with Python and OpenCV", Pyimagesearch, Oct. 31, 2016.
International Preliminary Report on Patentability dated Mar. 3, 2022 for International Patent Application No. PCT/US2021/015799.

* cited by examiner

SYSTEM AND METHOD FOR IDENTIFYING COMPUTING DEVICES IN A DATA CENTER

CROSS REFERENCE TO RELATED APPLICATIONS

This application is a continuation in part of U.S. patent application Ser. No. 16/779,563, filed on Jan. 31, 2020, which is hereby incorporated by reference in its entirety.

TECHNICAL FIELD

The present disclosure generally relates to the field of computing and, more particularly, to systems and methods for managing large numbers of computing devices in a data center.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many cryptocurrencies (e.g., Bitcoin, Litecoin) are based on a technology called blockchain, in which transactions are combined into blocks. These blocks are stored with previous blocks of earlier transactions into a ledger (the "blockchain") and rendered immutable (i.e., practically unmodifiable) by including a hash. The hash is a number that is calculated based on the blocks and that meets the blockchain's particular criteria. Once the block and hash are confirmed by the cryptocurrency network, they are added to the blockchain. The hashes can be used to verify whether any of the prior transactions or blocks on the blockchain have been changed or tampered with. This creates an immutable ledger of transactions and allows the cryptocurrency network to guard against someone trying to double spend a digital coin.

Many cryptocurrency networks consist of a large number of participants that repeatedly attempt to be the first to calculate a hash meeting the blockchain network's requirements. They receive a reward (e.g., a coin reward or transaction fee reward) that motivates them to continue participating (mining).

Many blockchain networks require computationally difficult problems to be solved as part of the hash calculation. The difficult problem requires a solution that is a piece of data which is difficult (costly, time-consuming) to produce, but is easy for others to verify and which satisfies certain requirements. This is often called "proof of work". A proof of work (PoW) system (or protocol, or function) is a consensus mechanism. It deters denial of service attacks and other service abuses such as spam on a network by requiring some work from the service requester, usually meaning processing time by a computer.

Participants in the network operate standard PCs, servers, or specialized computing devices called mining rigs or miners. Because of the difficulty involved and the amount of computation required, the miners are typically configured with specialized components that improve the speed at which hashes or other calculations required for the blockchain network are performed. Examples of specialized components include application specific integrated circuits (ASICs), field programmable gate arrays (FPGAs), graphics processing units (GPUs) and accelerated processing unit (APUs).

Miners are often run for long periods of time at high frequencies that generate large amounts of heat. Even with cooling (e.g., high speed fans), the heat and constant operation can negatively impact the reliability and longevity of the components in the miners. ASIC miners for example have large numbers of hashing chips (e.g., 100's) that are more likely to fail as temperatures rise.

Many participants in blockchain networks operate large numbers (e.g., 100's, 1000's or more) of different miners (e.g., different generations of miners from one manufacturer or different manufacturers) concurrently in large data centers. These data centers and large numbers of miners can be difficult to manage. Data centers housing large numbers of miners or other ASIC- or GPU-based systems have different challenges than traditional data centers housing more general computers. This is due to the significantly higher density, including higher power usage, higher heat generation, and near constant compute-intensive operation.

The constant operation at high temperatures often leads to component failures (e.g., broken fan or burnt-out chip). These failures require service personnel to physically locate the particular devices with the failed components (amongst thousands of devices) in order to service the device and replace the failed components. In very large data centers, there can be significant numbers of units failing each day, both for known and unknown reasons.

When a device is malfunctioning, a typical solution for the data center technician is to connect to the device's control interface (e.g., via network connection) and turn on or flash one of the computing device's status indicator lights. This allows the technician to more easily find the malfunctioning device amongst the hundreds or thousands of devices operating in the data center. Many data center operators organize devices based on their network location (e.g., by assigning a particular network port to a particular location in a server rack) to try to keep locations organized. Unfortunately, when dealing with such a large number of devices, either during initial setup or during a later move or repair, some devices may get swapped or misplaced and end up in unexpected locations. Furthermore, in the event of movement to wireless networks, mapping of physical locations by network ports will be significantly less effective.

For at least these reasons, there is a desire for a solution to allow for improved management of large numbers of computing devices in a data center.

SUMMARY

A system and method for more easily identifying a data center with a plurality of computing devices such as servers or miners is contemplated.

In one embodiment, the system comprises a first module configured to instruct a first computing device to flash an indicator light (e.g., LED) in a first pattern corresponding to a first encoded device identifier (ID) associated with the first computing device. A camera module may be configured to record a plurality of images (e.g. time lapse or video) of at least part of the data center including the first indicator light. A second module of the system may be configured to determine a position for the first computing device based on the location of the first indicator light as captured in the plurality of images.

In one embodiment, the first module may be configured to instruct the first computing device to stop flashing the first indicator light, and then instruct a second computing device to flash a second indicator light in a second pattern. A third module of the system may be configured to generate a 3D model of the data center by photogrammetry, wherein the 3D model associates a particular location to each of the plurality of computing devices. A fourth module of the system may be configured to compare the determined location of the particular computing device with a prior stored location for the particular computing device and create an alert in the event of a mismatch. The determined location may be quantized based on a predefined number of positions per rack.

A method for managing device location information within a data center housing a plurality of computing devices in a plurality of racks is also contemplated. In one embodiment, the method may comprise flashing an indicator light on a first computing devices selected from the plurality of computing devices in a first pattern that encodes a first device ID for the first computing device. A plurality of images of one or more of the racks may be captured and processed to decode a position of the first computing device. The images may be part of a captured video or time lapse sequence, and the flashing indicator light may flash in a pattern that periodically repeats. An indicator may be displayed on a user interface in response to successfully decoding the pattern, and a visual indicator of the successfully decoded device ID may be inserted into one or more of the plurality of captured images or in the 3D model.

Processing the captured images may comprise performing photogrammetry processing on the captured images to create a 3D model (e.g., of the racks and data center); and associating the successfully decoded device ID with a location in the 3D model. Photogrammetry processing may be performed on the captured images to create the 3D model, and the captured images may be filtered (e.g., with a Gaussian filter) to remove noise, redundant data, and bright spots from the flashing lights that may be disruptive to the 3D model creation. The 3D model may be rendered for the user. The device IDs may be superimposed on live video of the data center or on the rendered 3D model in their determined locations in order to assist the user in finding particular computing devices (e.g., mis-shelved devices).

A method for managing a data center housing a plurality of computing devices in a plurality of racks and connected via a plurality of network switches is also contemplated. Each of the ports of the network switches can be associated with a different physical location within the racks. A first list of computing device ID to location mappings can be generated by querying each of the network switches for a list of connected IP addresses and corresponding port numbers. The corresponding port numbers can be converted into locations based on the network switches' ports' location associations. A second list of computing device ID to location mappings are generated by querying a database. One or more potentially misplaced or mis-located computing devices that have different values in the first list and the second list are selected and have their indicator lights turned on (e.g., flashed) to aid data center staff in finding them. The indicator lights can be flashed in a pattern that encodes a device ID for the computing device, and the pattern can be repeated until the device ID is detected by processing images of the data center captured by a camera. This confirms the actual location of the potentially misplaced or mis-shelved device.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
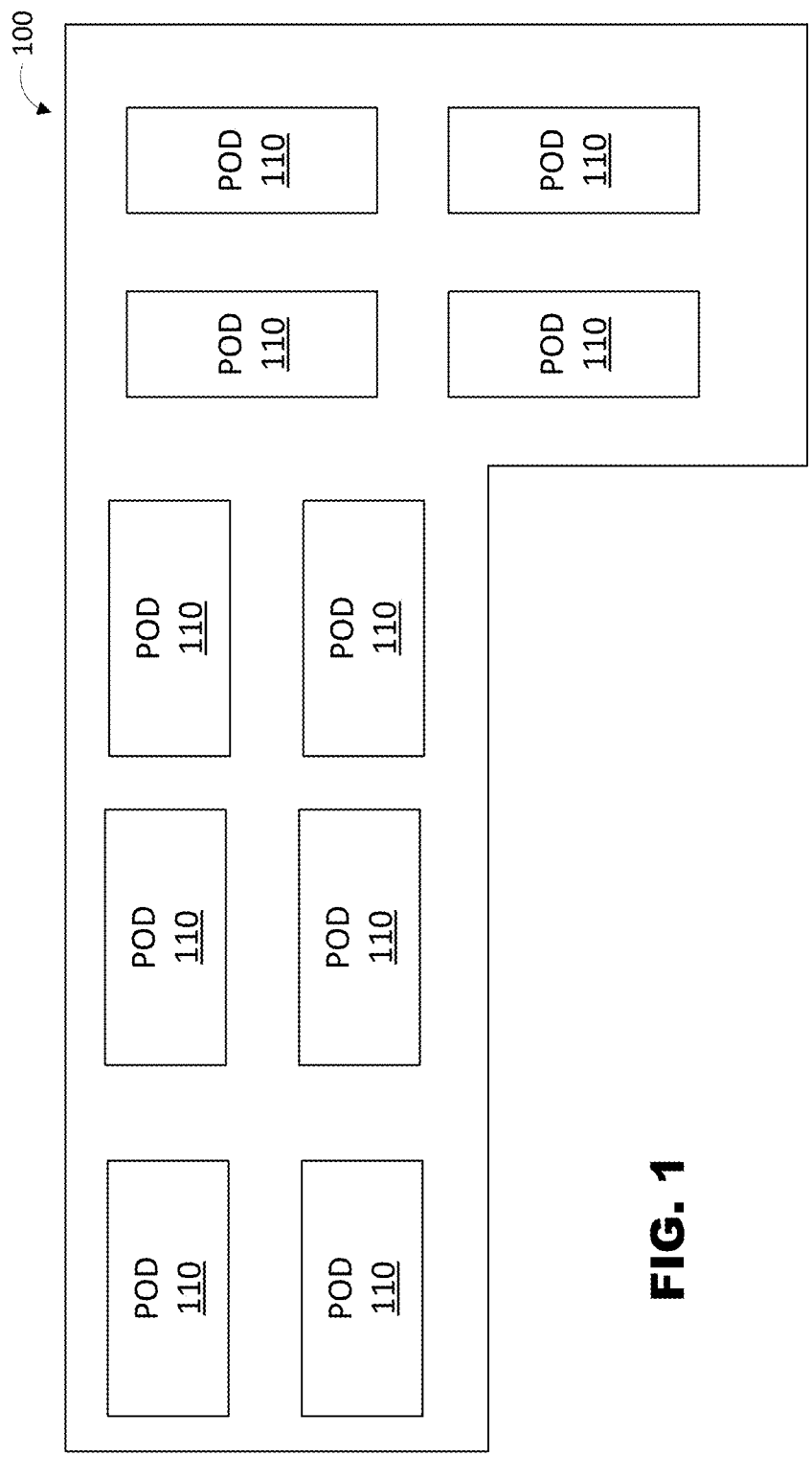
FIG. 1 is a top-down view of one example of a data center for computing devices.

Referring now to FIG. 1, a top-down view of one example of a data center 100 for computing devices is shown. The data center 100 is configured with a large number of pods 110. Pods are standardized blocks of racks, either in a row or (more typically) a pair of rows, that share some common infrastructure elements like power distribution units, network routers/switches, containment systems, and air handlers. For example, a pod may have two parallel racks of devices, spaced apart and each facing outwards. The devices on the racks may all be oriented to pull cool air in from outside the pod and discharge the hot air (heated by the computing devices) into the empty space in the center of the pod where the hot air then rises up and out of the data center. For example, there may be hot air ducts positioned above the middle of each pod to capture the hot waste air and then discharge it out of the data center via vents in the roof of the data center.

Figure 2:
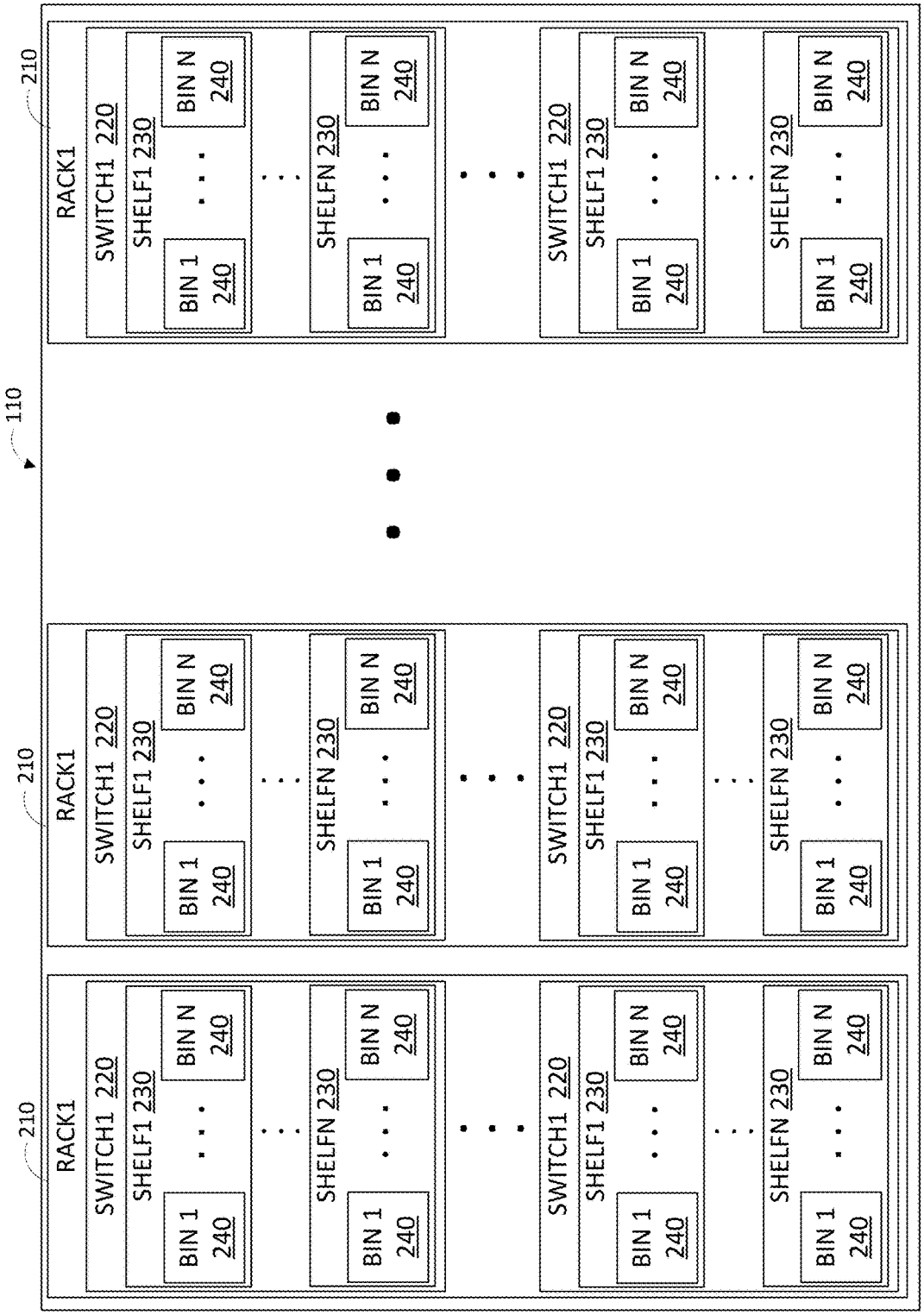
FIG. 2 is a front view of one example of a pod in a data center for computing devices.

Turning now to FIG. 2, the front side of one example of a pod 110 is shown. The pod 110 has a number of racks 210 that each have a number of shelves 230 for holding computing devices. For organization and management purposes, the shelves may be grouped together in switch sections 220 that are each supported by the same network switch. In each of the shelves 230 there may be multiple bin locations 240 that each hold a single computing device. Each computing device may be installed in a bin with connections for power and a network connection.

Figure 3:
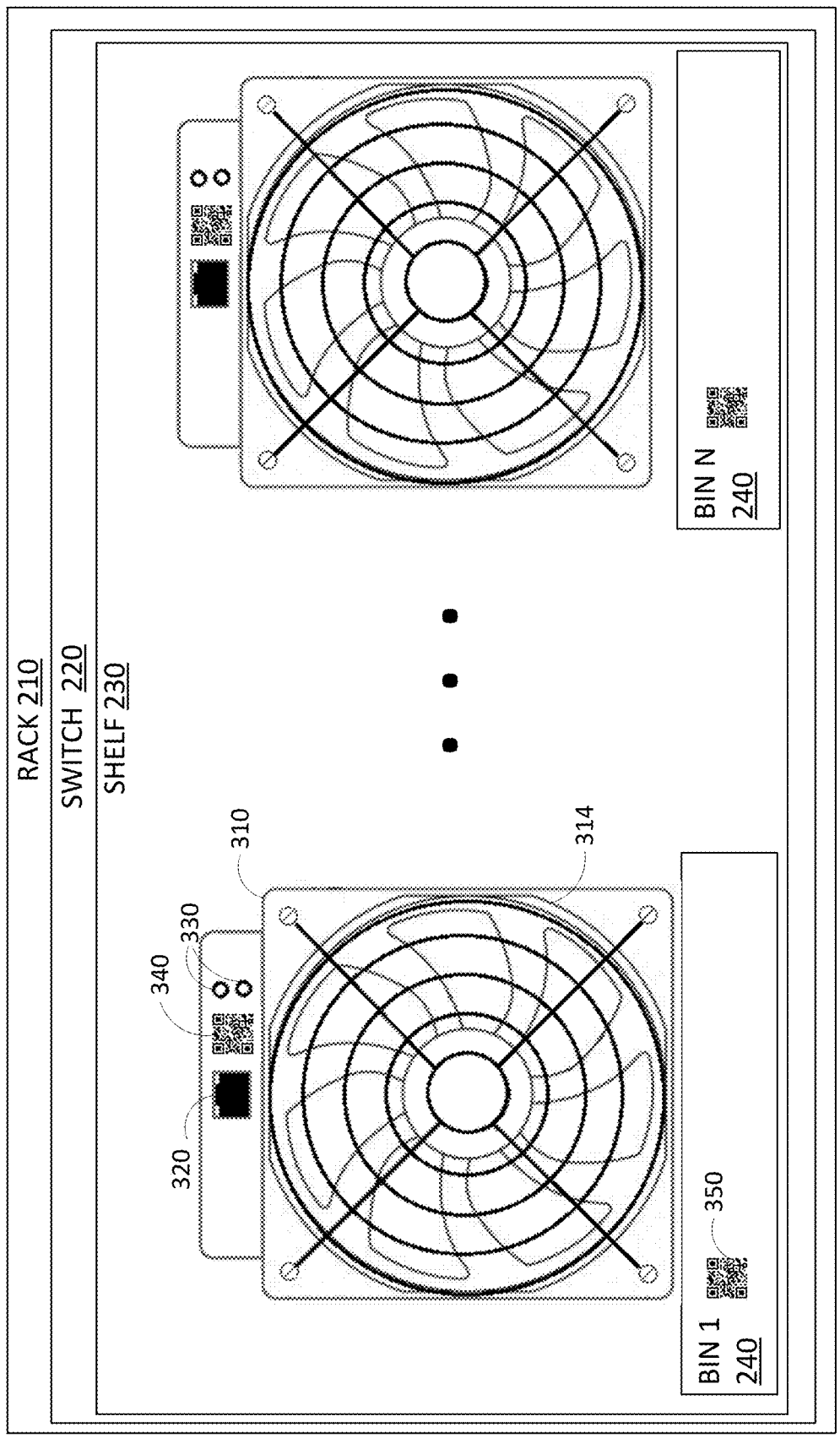
FIG. 3 is an illustration of one example of a portion of a rack for computing devices in a data center.

Turning now to FIG. 3, a more detailed frontal view of one shelf 230 in an example rack 210 is shown. In this example, a computing device 310 is installed in each bin 240 in the shelf 230. In this example, computing device 310 is an ASIC miner, but other computing device types are possible and contemplated. ASIC miners typically include one more of cooling fan 314 that draw air through the center of the miner where there are multiple hash boards performing calculations and generating heat. Other types of computing devices are possible and contemplated, including GPU and FPGA miners, as well as more traditional computer servers.

As shown in the figure, devices and bins may be identified by stickers 340 and 350, respectively. These stickers may include visual indicators such as printed serial numbers, asset tag numbers, and or barcodes or QR codes. The devices also have one or more indicator lights (typically LEDs) 330 that are visible from the front side of the device, and many such devices provide an interface accessible via network connection that permits a system administrator to activate/deactivate the light.

Figure 4:
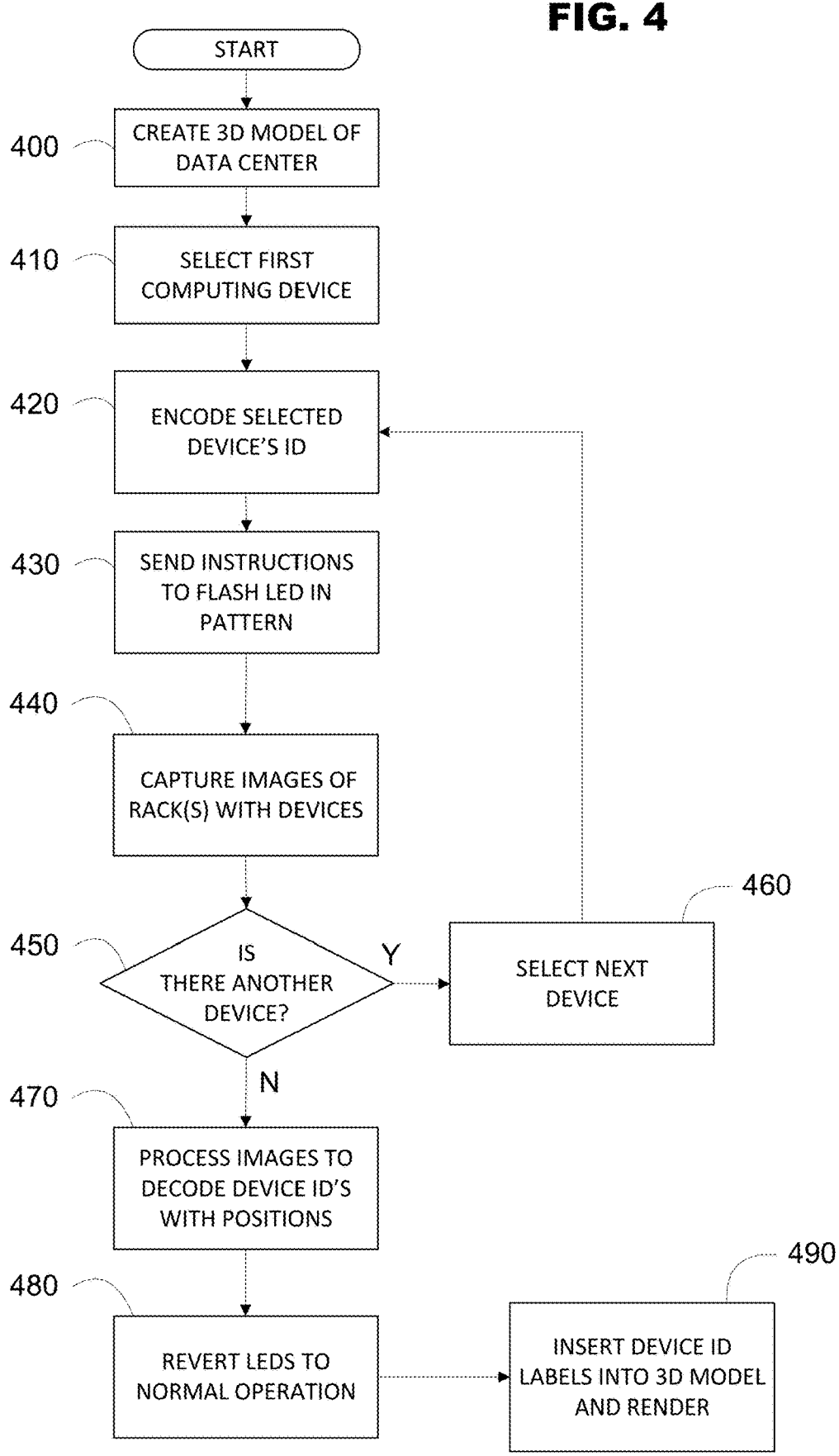
FIG. 4 is a flow chart of an example embodiment of a method for identifying computing devices in a data center according to the teachings of the present disclosure.

Turning now to FIG. 4, a flow chart is shown illustrating an example embodiment of a method for identifying computing devices in a data center according to the teachings of the present disclosure. A 3D model of the data center is created (step 400). This can be generated by prompting the user to enter the relative coordinates and orientation of each pod and the number of racks, pods, and bins each pod (e.g., assuming relatively even spacing). This can also be generated using a 3D drawing program or interface, or automatically created using photogrammetry (as described further below).

A first computing device is selected (step 410), and the device's ID (e.g., asset tag number or serial number) is encoded. One simple encoding mechanism that can be used is PDM (Pulse Distance Modulation) as used in consumer IR remote controls. In this encoding method, data is encoded by modulating the duration of the space between light pulses, while the pulse time remains constant. For example, a '1' could be encoded by a 0.125 sec light pulse followed by a 0.25 sec space, and a '0' encoded by a 0.125 sec pulse followed by a 0.125 sec space. The data stream can be terminated by a trailing pulse so that the length of the last space can be determined. Other encodings are possible and contemplated, including Pulse Width Modulation (PWM) or even Morse code. The device ID (e.g., device serial number, MAC address, asset tag number) can be encoded as a binary value, for example using ASCII or other binary encoding.

In some embodiments, a device status code may also be encoded and flashed by the indicator light in addition to the device ID. For example, if a computing device loses connection to the network, it may be configured to automatically flash its indicator light to convey a status code indicating a loss of network connectivity (e.g., in addition to its device ID). In some embodiments, the computing device may have multiple indicator lights (e.g., two or more multi-color LEDs) that can be used in combination to convey the device ID (and additional data desired such as a status code). For example, with two indicator lights, one may be configured to flash in a pattern conveying the device ID while the other conveys a device status code. Or they may be used in combination (e.g. synchronously) to improve data throughput. For example, with three lights each having only a single color (e.g., each binary) could be used in combination to convey octal encoded data. In another example, if there are N indicator lights, and each of the indicator lights is capable of illuminating in M colors, the first device ID (and the device status code if desired) then $(M+1)^N$ states are available at one time (e.g., with 3 lights each capable of 3 different colors (plus off) resulting in $(3+1)^3=64$ possible states, so 6-bit encoding may be used).

An instruction is transmitted on the network to cause the target computing device to flash its indicator light in a pattern that represents the encoded ID (step 430). Images are captured of all or portions of one or more racks in the data center (step 440). Multiple images are captured of each computing device such that the sequence of images capture the flashing of the computing device's indicator lights. For example, these images may be video recorded by a mobile device with a camera, e.g., a smartphone or tablet, that a user aims at the racks and slowly walks through the data center with. In another embodiment, the images may be captured by one or more stationary or motion-controllable webcams or security cameras that are mounted at different locations within the data center. The rate of the flashing should be low enough that the frame capture rate of the camera is able to capture the data conveyed by the flashing indicator lights. In other words, the frequency (e.g., pulse width) should be selected to ensure that the pulses can be easily detected based on the framerate. For example, if recording video at 60 frames per second, then a pulse width of 0.1 sec would ensure that multiple frames (e.g., 6 frames) capture the pulses of the indicator light. Having multiple frames capture each pulse may be desirable to overcome compression or noise filtering that occur within the camera that might filter out a single frame of the illuminated indicator light. The computing device may be configured to repeat the pattern of flashes until instructed to stop, and the user may be instructed to ensure that each area of the data center being imaged is captured (e.g., video is recorded) for more than the time required to capture the full repeating pattern. In some embodiments information about the layout of the data center (e.g., number of racks per pod, size of racks, number of shelves per rack and bins per shelf) may be used to quantize the location of the detected device IDs into predefined locations.

Some devices may not be configured to flash their indicator light in programmable patterns. Those devices can be reprogrammed (e.g., custom firmware in the case of an ASIC miner), or the instructions to the device may be sent in a timed pattern to generate the desired indicator light flashing pattern. For example, if the device only supports "indicator light on" or "indicator light off" instructions, then an "indicator light on" instruction followed by an "indicator light off" instruction 0.125 sec later can be used to generate the desired pulse. In some embodiments, the timing of the instructions may need to be adjusted (e.g., longer encoding pulse widths and longer spaces between pulses) to account for variability in network latency.

Some devices may have multiple indicator lights of different colors (e.g., one red, one green, one blue). These devices may be instructed to flash different patterns with each color to effectively increase the bandwidth of information being conveyed via the flashing patterns.

This encoding and flashing process may be repeated multiple times (step 450) for different computing devices by selecting the next device (step 460) and encoding the device ID (step 420), causing the indicator light to flash (step 430), and capturing images of the relevant portion of the data center (step 440). The captured images may then be processed to decode the device IDs (step 470) that were encoded in the flashing lights captured in the images. The state of the indicator lights may then be reverted back to their normal operation (step 480). Processing the images may include detecting the pixels corresponding to the brightest spots in the indicator light color(s). This can for example be performed using software libraries such as OpenCV (Open Source Computer Vision Library). The pixels corresponding to a particular indicator light can be tracked across captured images in order to determine the flashing pattern and the encoded device ID. Photogrammetry can be used to determine the position of each indicator light based on the bright pixels in the captured images. This can be used to determine the location of the corresponding device ID (e.g., by selecting the nearest quantized device location in the nearest rack).

If multiple colored indicator lights are used, the captured images can be filtered for bright pixels corresponding to each of the different colors to extract the information conveyed by each color separately. This information can then be combined to form the device ID. For example, the red indicator light may transmit a pattern indicative of the first three bits of the device ID, the green indicator light may transmit a pattern indicative of the second set of three bits of the device ID, and so on.

The locations for the device IDs may be stored into a database and/or inserted into the 3D model at the appropriate location for rendering (step 490), e.g., as a texture mapped text area superimposed on the surface of the portion of the 3D model corresponding to the computing device with that device ID. Beneficially, the ability to render the model in 3D may allow the user to navigate through the data center in 3D (e.g., via a computer, tablet, mobile phone, or virtual reality headset) and easily see where each device id is located. Similarly, once the 3D model is created and populated with device IDs, the user may be able to search for and easily locate a particular computing device with a particular device ID even if it was mis-shelved.

The order of the steps in the flowcharts depicted herein may be performed in a different order or in parallel depending on the implementation. For example, multiple devices may be configured to flash their encoded device ID's at the same time (e.g., an entire shelf or rack). Similarly, the captured images may be processed (e.g., on a server that receives them from the device with the camera, or in an app on the device itself) as they are received.

Figure 5:
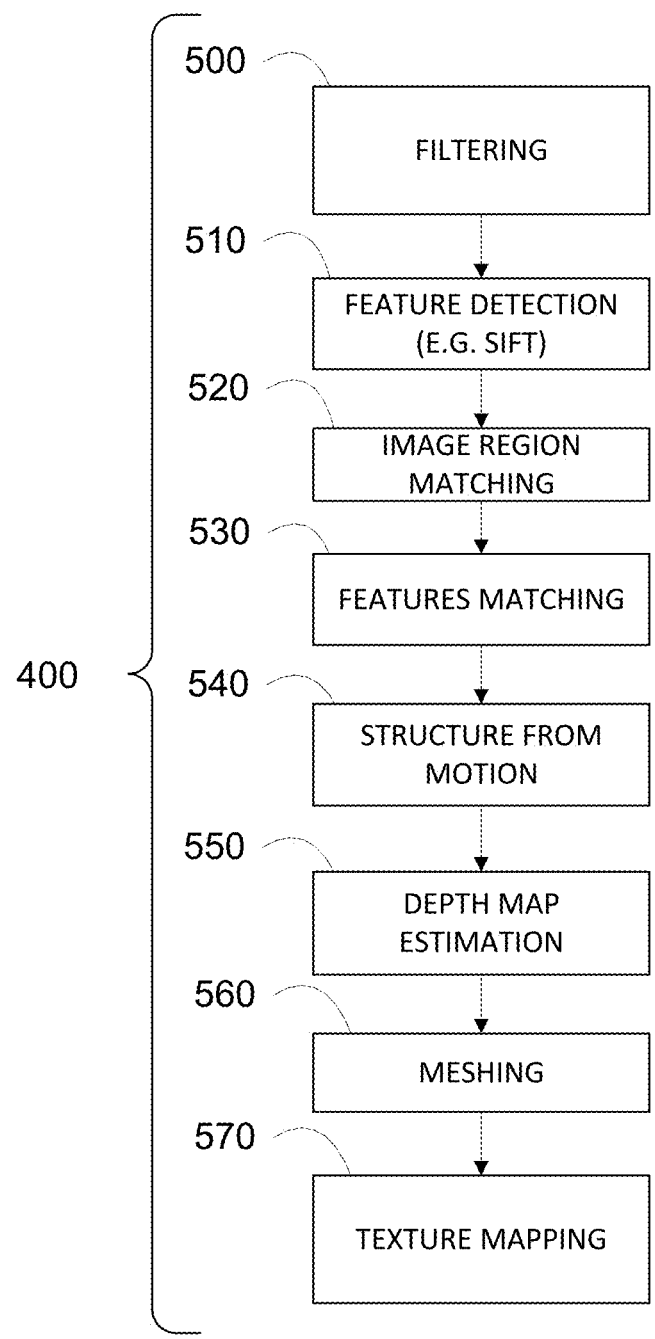
FIG. 5 is an illustration of one example embodiment of 3D model creation from FIG. 4.

Turning now to FIG. 5, details of one embodiment of a method for creating a 3D model of the data center (step 400 from FIG. 4) are shown. In this embodiment, a 3D reconstruction pipeline is used to create a 3D model from the series of captured images (called photogrammetry). First, the captured images may be optionally filtered (step 500). For example, pixels corresponding to the flashing indicator lights may optionally be initially filtered, as the changes in illumination may impede the 3D reconstruction and may be processed separately or later added back in for indicator light pattern processing. If the images are captured at a high frame rate (e.g., 60 fps), some number of frames may be optionally dropped (e.g., keeping only 1 in every 30 frames captured) in order to create a more manageable working set for creating the initial 3D model, but the additional frames may be used for determining the indicator light patterns.

Next, distinctive sets of pixels that are relatively invariant across different camera viewpoints are identified (step 510). One known method for performing this extraction is scale-invariant feature transform or SIFT. The series of images may be grouped based on time stamp, and neighboring images (that remain after filtering) may then be searched to identify common regions that are captured across multiple images (step 520). Features in different images are matched (step 530), and structure from motion (SfM) processing (step 540) is performed on the matches to estimate three-dimensional structures from the captured two-dimensional image sequences. Next, depth values are calculated (step 550). The results are meshed (step 560) to create a 3D wireframe of the scene, which are then texture mapped (step 570) using textures from the captured imaged in order to complete the 3D model. Processing of the indicator light patterns may then be performed and the corresponding device IDs may be added into the 3D model at the appropriate locations.

Examples of existing software libraries that may be used to perform one or more of these steps include OpenMVS (open Multi-View Stereo reconstruction library) and Meshroom (open source photogrammetry software based on the AliceVision framework).

Figure 6:
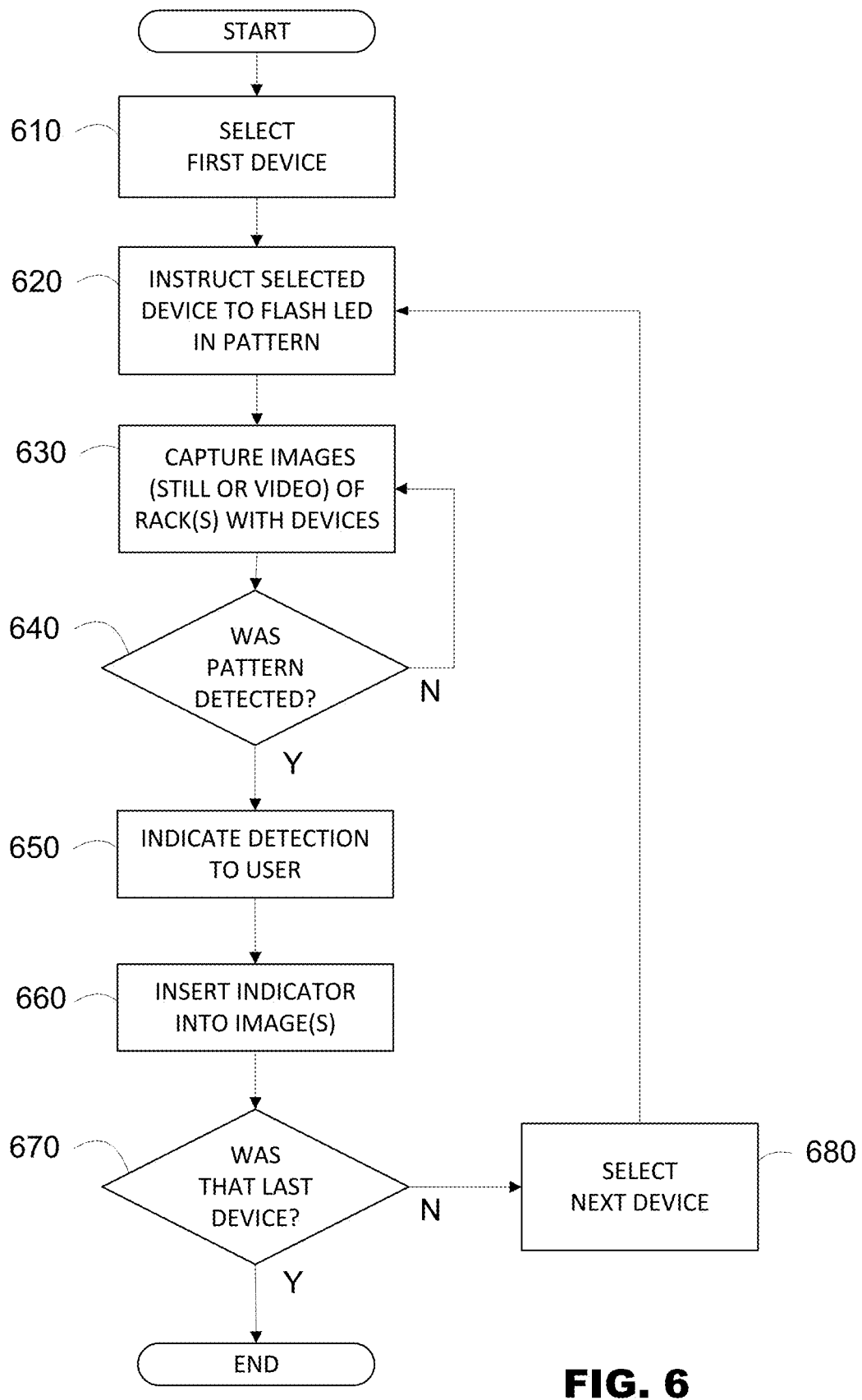
FIG. 6 is a flow chart of another example embodiment of a method for identifying computing devices in a data center according to the teachings of the present disclosure.

Turning now to FIG. 6, another embodiment of a method for identifying computing devices in a data center is shown. In this embodiment, there is interactivity between the user capturing the images of the data center and the system processing the images. This embodiment may be particularly helpful for data center technicians that are looking for a particular one or more computing devices in a particular area of a data center. In this embodiment, a first computing device is selected (step 610), and one or more instructions are issued to cause the device to flash its indicator light (e.g., LED) in a pattern that encodes the device's ID (step 620). The user captures images of the rack of devices with a mobile device with a camera and display (step 630), and the system (which may be implemented in the mobile device or another computing device wirelessly communicating with the mobile device) processes the captured video or stream of images to determine if the pattern indicative of the selected first computing device was detected (step 640). If the pattern was detected, the user is notified (step 650). The system may also be configured to insert an indicator onto the live image of the mobile device in the appropriate location to allow the user to easily find the target device (step 660). If more devices are of interest (step 670), the next device is selected (step 680) and the prior steps are repeated.

Figure 7:
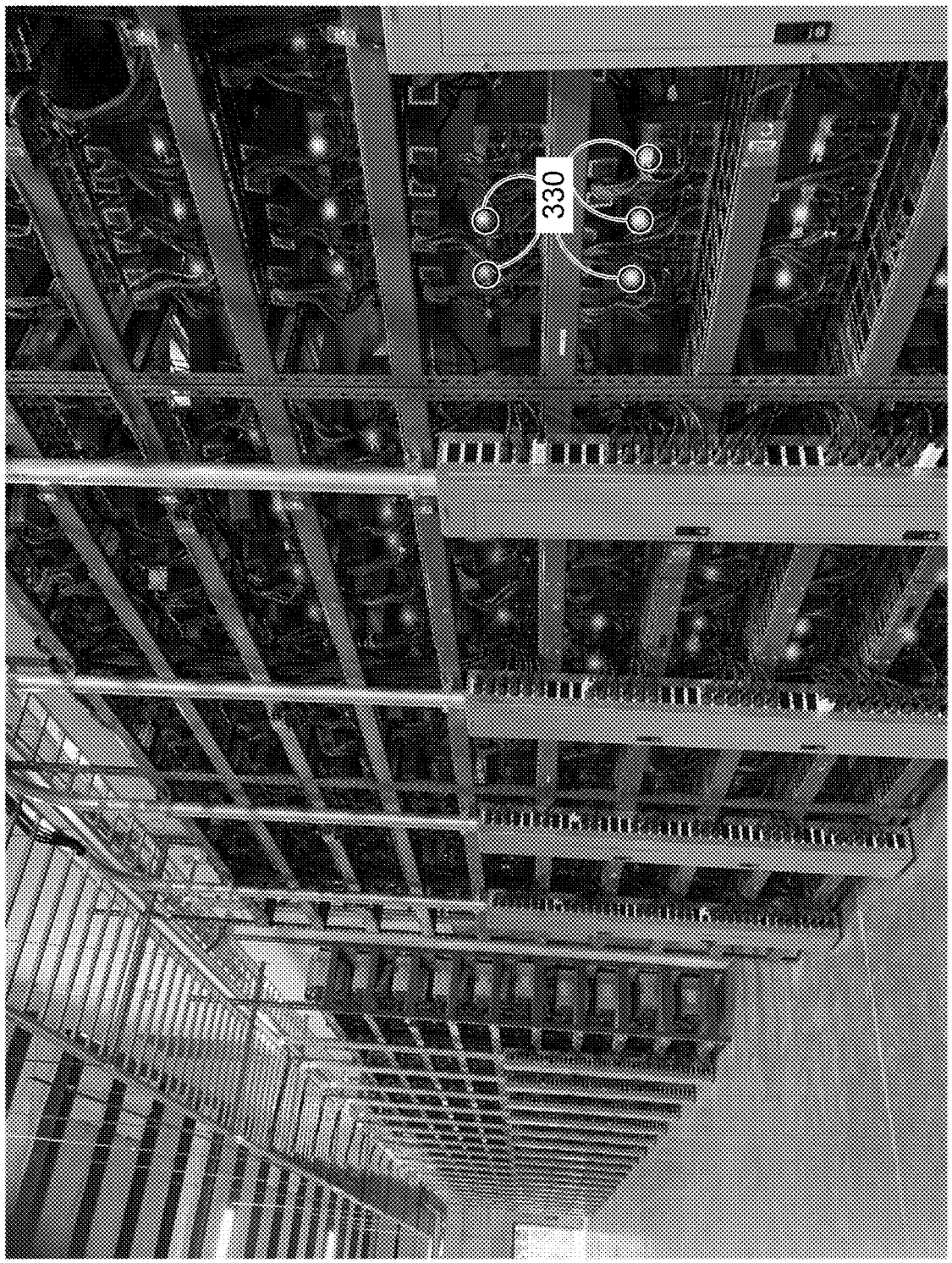
FIG. 7 is an illustration of an example of a captured image of a data center.

Turning now to FIG. 7, an example captured and filtered image of a data center is shown. As shown in the image, the glowing indicator lights 330 are evident. Preferably color images or video are captured, as the indicator lights are typically red or green or blue, and the color values typically offer more differentiation from other features in the data center than blank and white images offering brightness differentiation alone.

Figure 8:
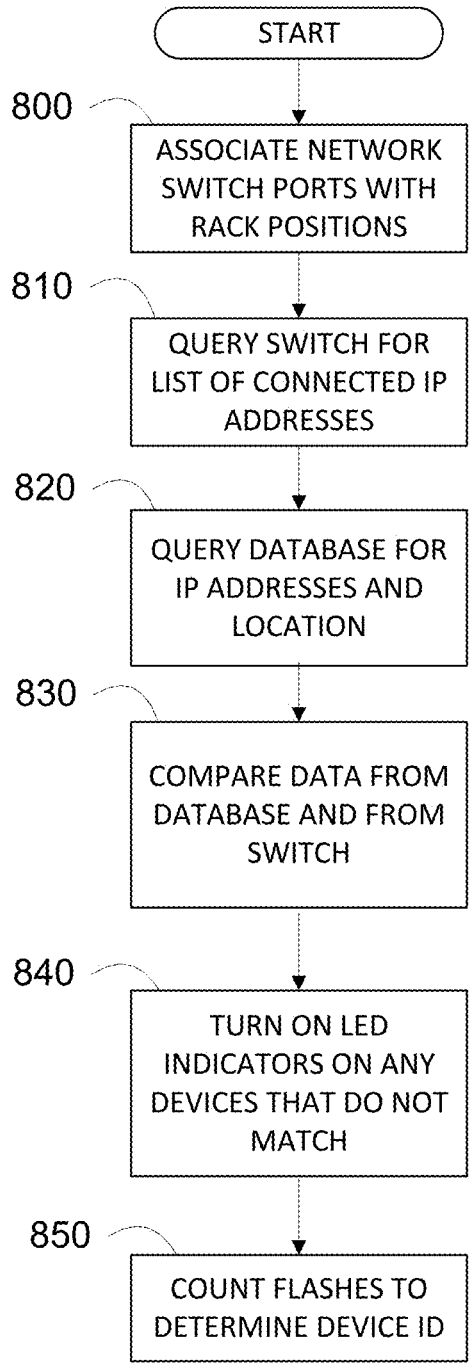
FIG. 8 is a flow chart of another example embodiment of a method for identifying computing devices in a data center according to the teachings of the present disclosure.

Turning now to FIG. 8, a flowchart is shown illustrating another embodiment of a method for identifying computing devices in a data center. In this embodiment, network switch ports are associated with physical locations (e.g., bins) in the data center's racks (step 800). Next, a particular switch is queried to determine a list of IP addresses connected to the particular switch's ports (step 810). A database of computing device to IP address and location information is queried for one or more computing devices (step 820), and data from the switch and database are compared (step 830). Any computing devices with mismatches are sent instructions to flash their indicator lights (step 840). In some embodiments, the flashing may be performed in a pattern as described above to encode the device ID or other identifier.

Figure 9:
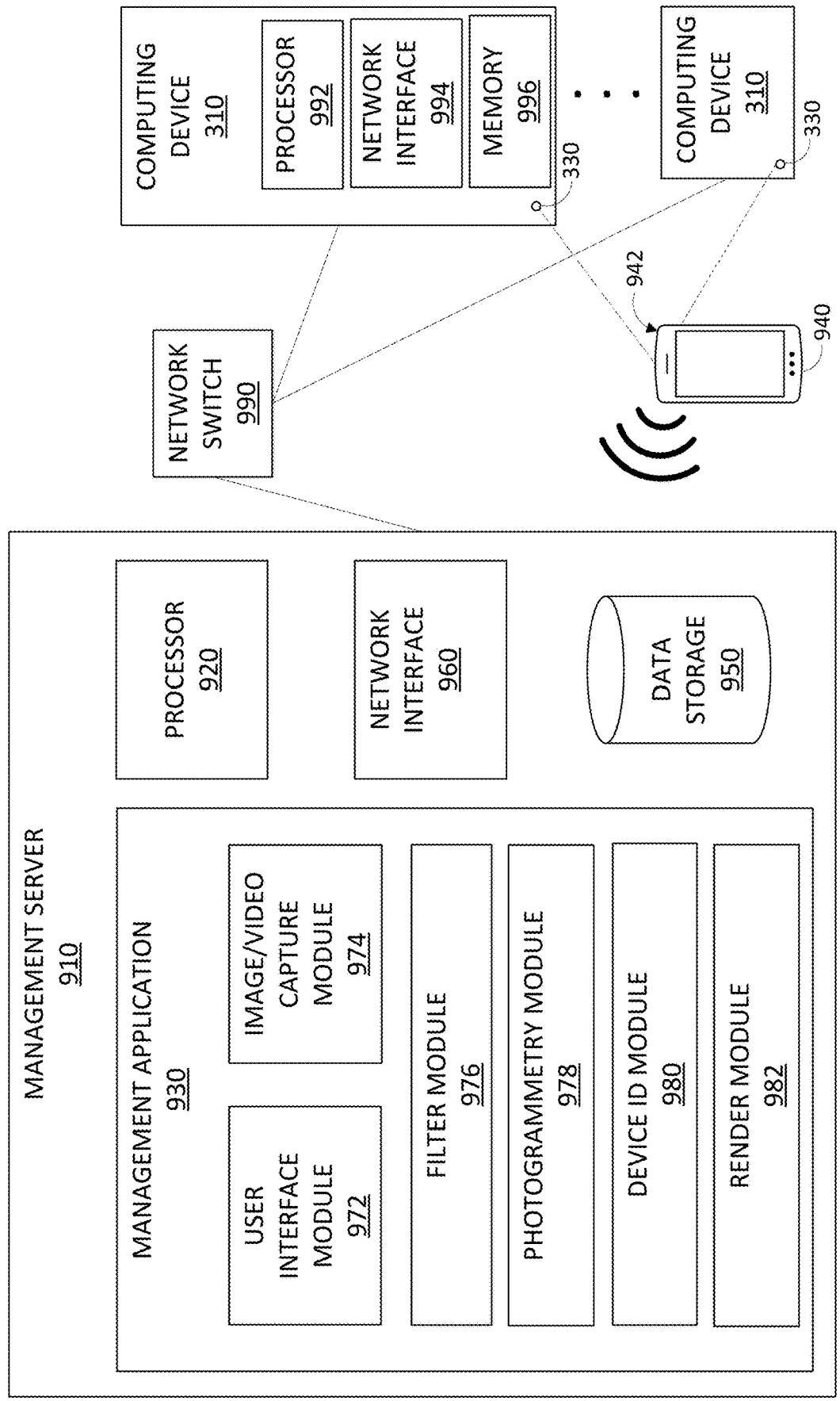
FIG. 9 is an illustration of an example embodiment of a system for identifying computing devices in a data center according to the teachings of the present disclosure.

Turning now to FIG. 9, an illustration of an example embodiment of a system 900 for identifying computing devices in a data center is shown. In this embodiment, the system 900 comprises a large number of computing devices 310 (e.g., miners or servers). Each device 310 comprises one or more processors 992, one or more network interfaces 994, a memory 996 (e.g., non-volatile flash memory configure to store firmware), and one or more indicator lights 330. The memory 996 may be configured to store instructions that are executable by processor 992. In one embodiment, the instructions cause processor 992 to monitor network interface 994 and in response to receiving a flash device ID instruction cause indicator light 330 to flash in a pattern that encodes or is representative of a device ID for computing device 310.

In some embodiments, computing devices 310 may be configured to communicate over network connections to network switch 990, which in turn is configured to communicate with a management server 910 via the server's network interface 960. While wireless networks are possible (and may be preferred for communication with mobile device 940), current computing device density in data centers means wired networks (e.g., ethernet) and network switches 990 are currently preferred for communications between management server 910, and computing devices 310.

Mobile device 940 may for example be a mobile phone or tablet configured with a camera module 942 (e.g., digital camera, traditional or with additional depth-sensing sensors such as lidar) capable of taking video or time lapse images of computing devices 310. In one embodiment mobile device 940 may be configured to send the captured images or video to management server 910 wirelessly, and management server 910 may be configured to store them in data storage 950 prior to processing by management application 930 as executed by processor 920. Management application 930 may include an image/video capture module 974 that is configured to communicate with mobile device 940 and process and store the captured images in data storage 950. Management application 930 may also include a filter module 976 that is configured to filter the incoming images/video, a photogrammetry module 978 that is configured to create a 3D model of the data center based on the captured images/video, and a device ID module 980 that is configured to detect and decode the pixels in the captured images/video corresponding to the flashing indicator lights in order to determine the corresponding device IDs and locations of those device IDs within the 3D model of the data center.

Management application 930 may further include a user interface module 972 configured to communicate with the user (e.g. of mobile device 940) and rendering module 982 that is configured to render the 3D model of the data center (e.g., for display on mobile device 940).

Management server 910 may be a traditional PC or server, or specialized appliance. Management server 910 may be configured with one or more processors 920, volatile memory and non-volatile memory such as flash storage or internal or external hard disk (e.g., network attached storage accessible to server 910). Server 910 is configured to execute management application 930 to assist users (e.g., data center technicians) with identifying computing devices 310.

Management application 930 is preferably implemented in software (e.g., instructions stored on a non-volatile storage medium such as a hard disk, flash drive, or DVD-ROM), but hardware implementations are possible. Software implementations of management application 930 may be written in one or more programming languages or combinations thereof, including low-level or high-level languages, with examples including Java, Ruby, JavaScript, Python, C, C++, C #, or Rust. The program code may execute entirely on the user's computer or device (e.g., mobile device 940), partly on the user's computer or device, as a stand-alone software package, partly on the user's computer or device and partly on a remote computer or server (or server 910), or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." and "for example" in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for managing a data center housing a plurality of computing devices in a plurality of racks, the method comprising:
   selecting a first computing device from the plurality of computing devices;
   flashing an indicator light on the first computing device in a first pattern that encodes at least a portion of a first device ID for the first computing device and a device status code for the first device;
   capturing a plurality of images of one or more of the plurality of racks, wherein at least some of the plurality of images include the flashing indicator light; and
   processing the captured images to decode a position of the first computing device.

2. The method of claim 1, further comprising one or more additional indicator lights, wherein the total number of the indicator lights is N, wherein the first device ID and the device status code are N-bit encoded with each of the indicator lights conveying one bit of the N-bit code.

3. The method of claim 1, wherein processing the captured images includes determining the first device ID and the device status code via decoding the first pattern, and the method further comprising displaying an indicator on a user interface in response to successfully decoding the first pattern from the plurality of images.

4. The method of claim 3, further comprising inserting the decoded first device ID and device status code into one or more of the plurality of captured images.

5. The method of claim 4, wherein processing the captured images comprises:
   performing photogrammetry processing on the captured images to create a 3D model of at least part of the data center; and
   associating the decoded first device ID with a location in the 3D model.

6. The method of claim 1, further comprising, while flashing the indicator light on the first computing device, flashing a second indicator light on the first computing device in a second pattern that encodes at least a second portion of the first device ID, wherein:
   flashing the second indicator light includes flashing the second indicator light in a different color than the indicator light; and the first pattern and the second pattern each encode a different portion of the first device ID and the device status code.

7. The method of claim 1, wherein processing the captured images comprises creating a three-dimensional model of the data center, wherein the three-dimensional model comprises three-dimensional location and orientation information for the racks, wherein the method further comprises rendering a three-dimensional model of the data center with the first device ID and device status code superimposed thereon.

8. A system for identifying a plurality of computing devices in a data center, the system comprising:
   a first module configured to instruct a first computing device to flash two or more indicator lights synchronously to encode in a first pattern corresponding to at least a portion of a first encoded device ID associated with the first computing device;
   a camera module configured to record a plurality of images of least part of the data center, wherein the plurality of images includes the indicator lights; and
   a second module configured to determine a position for the first computing device based on the location of the indicator lights as captured in the plurality of images.

9. The system of claim 8, wherein the first module is further configured to:
   instruct the first computing device to stop flashing the indicator lights, and
   instruct a second computing device to flash a second set of indicator lights associated with the second computing device in a second pattern.

10. The system of claim 8, further comprising:
    a third module configured to generate a 3D model of the data center by photogrammetry, wherein the 3D model associates a particular location to each of the plurality of computing devices.

11. The system of claim 8, further comprising:
    a fourth module configured to:
    compare the determined location of the particular computing device with a prior stored location for the particular computing device; and
    create an alert in the event of a mismatch.

12. The system of claim 8, wherein the first pattern also corresponds to a device status in addition to the first encoded device ID.

13. A computing device capable of being easily identifiable in a data center, the computing device comprising:
    a case;
    a processor positioned within the case;
    a non-volatile memory connected to the processor and configured to store instructions to be executed by the processor;

a network interface connected to the CPU; and two or more indicator lights connected to the CPU and visible outside the case, wherein the CPU is configured to execute the stored instructions and cause the indicator lights to flash in combination to convey in a first pattern representing at least a first portion of a device ID of the computing device in response to receiving a flash device ID instruction via the network interface.

14. The computing device of claim 13, wherein the first pattern further represents a device status.

15. The computing device of claim 14, wherein N is the number of the indicator lights, wherein the first device ID and the device status code are N-bit encoded with each of the indicator lights conveying one bit of the N-bit code.

16. The computing device of claim 15, wherein each of the indicator lights is monochromatic.

17. The computing device of claim 14, wherein N is the number of the indicator lights, and wherein each of the indicator lights is capable of illuminating in M colors, wherein the first device ID and the device status code are encoded using $(M+1)^N$ states.

* * * * *